US008192135B2

(12) United States Patent
Ceccarelli et al.

(10) Patent No.: US 8,192,135 B2
(45) Date of Patent: *Jun. 5, 2012

(54) SIDE PULLER ACCESSORY FRAME FOR A CAR CARRIER AND FOR A TOW TRUCK

(75) Inventors: Charles J Ceccarelli, Mountain Home, ID (US); Steven Delaplain, Mountain Home, ID (US); Aaron Martin, Mountain Home, ID (US)

(73) Assignee: Rimco, Inc., Mountain Home, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,114

(22) Filed: May 6, 2011

(65) Prior Publication Data
US 2011/0204305 A1 Aug. 25, 2011

(51) Int. Cl.
*B60P 3/12* (2006.01)
(52) U.S. Cl. ....................................................... 414/563
(58) Field of Classification Search .................. 414/563; 254/323, 361
See application file for complete search history.

(56) References Cited

U.S. PATENT DOCUMENTS

| 1,359,379 A | 11/1920 | Holmes |
| 2,928,557 A | 3/1960 | Cline |
| 6,443,685 B1 | 9/2002 | Maeno |
| 6,543,749 B1 | 4/2003 | Duvall |

OTHER PUBLICATIONS

Zacklift Installation & Operation Instructions for Zacklift Frame Lifts, Stiffleg Installation (p. D-8).
Zacklift Heavy Duty Underlifts, 75 Years on the road, 75th Anniversary publication (1923-1998), unnumbered page concerning Zacklift 38,000 pound Hydraulic Stiff Legs.
Unknown Author, Holmes Tilt-Bed Carrier [Print-out of jpeg image file (1 page)], 00/00/1916 (?), Publisher: Ernest Holmes Co. (?), Chattanooga, Tennessee, U.S.A.
Unknown Author, Holmes Tilt-Bed Carrier [Print-out of jpeg image file (1 page)], (appears to be enlargement of a portion of immediately prceding image)], 00/00/1916 (?), Publisher: Ernest Holmes Co. (?), Chattanooga, Tennessee, U.S.A.

*Primary Examiner* — Charles A Fox
(74) *Attorney, Agent, or Firm* — Michael P. Mazza, LLC

(57) ABSTRACT

A side puller accessory frame for a tow truck having a cab and a truck frame mounts to the truck frame behind the cab. The accessory frame preferably includes two stiff legs, a wire rope winch mounted transverse to the longitudinal axis of the truck that provides pulling force via a removable pivotable center sheave that directs the pulling force to sides or the rear of the truck as desired. The accessory frame may include a removable pivotable side sheave that may mount in a side sheave mounting tube. The side puller accessory frame makes a conventional car carrier with a roll back bed a recovery truck.

7 Claims, 4 Drawing Sheets

SIDE PULLER ACCESSORY FRAME FOR A CAR CARRIER AND FOR A TOW TRUCK

CROSS-REFERENCE TO RELATED APPLICATIONS

Applicants claim any and all benefits that flow from their provisional patent application Ser. No. 60/471,070 filed May 15, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a novel side puller accessory frame for the pulling of loads by a car carrier 8 or tow truck from a point behind and in close proximity to a cab of the carrier or truck. The invention could also be used with other vehicles. The side puller accessory frame has an accessory frame mounting that mounts the accessory frame to a vehicle frame behind a cab and transverse to the longitudinal axis of the vehicle. A vehicle equipped with the side puller accessory frame may function as a recovery apparatus. The accessory frame includes a powered winch that is equipped with a suitable line, preferably a wire rope, to permit the pulling of a load or loads such as wrecked cars from accidents and other objects towards the sides of the recovery apparatus as well as towards the rear.

The accessory frame preferably includes two manually actuated nesting legs, a wire rope winch fixed to the accessory frame mounting near the center of the accessory frame with the winch transverse to the longitudinal axis of the vehicle. The winch provides pulling force via a removable pivotable center sheave mounted in a center sheave mounting tube through a top horizontal frame tube. The center sheave directs the pulling force to the sides or rear of the truck as desired or as rigged by a recovery technician, driver, or other user. The accessory frame may include a removable pivotable side sheave mounted in a side sheave mounting tube. The side puller accessory frame increases the value of a conventional car carrier with a roll back bed by making the carrier into a versatile recovery truck.

When a conventional tow truck limited to pulling along the longitudinal axis of the truck recovers a load (often a wrecked motor vehicle) from off the road, the tow truck often must use more than one lane of traffic. The instant accessory frame, when mounted to a car carrier with a rollback bed, allows the car carrier to be used as a recovery apparatus. The accessory frame gives the carrier an advantage over the conventional tow truck, the capacity to recover over the side of the carrier while taking up at most one lane of traffic.

BRIEF SUMMARY OF THE INVENTION

A principal objective of this invention is to provide a novel and improved side puller accessory frame to be mounted on a car carrier to allow the carrier to function as a recovery apparatus. The invention provides multiple useful angles of pulling power towards the sides and rear of the carrier.

Another objective is to provide an accessory frame that will reduce the lateral space (number of lanes of traffic) needed by a recovery apparatus performing a recovery. A vehicle equipped with the instant side puller accessory frame can operate from a shoulder of the road of from a single lane of traffic and from there recover a vehicle or load from off the side of a road.

Additional and various other objects and advantages attained by the invention will become more apparent as the specification is read and the accompanying figures are reviewed.

DETAILED DESCRIPTION OF THE INVENTION

Figure 1:
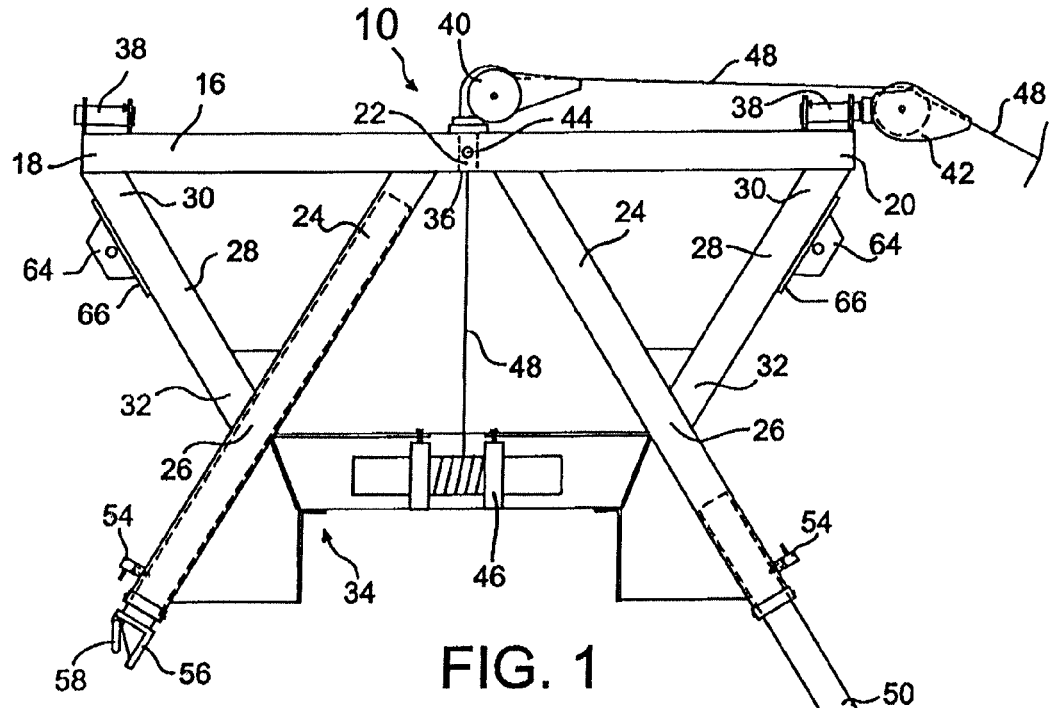
FIG. 1 is a rear elevation of a preferred side puller accessory frame.
Figure 2:
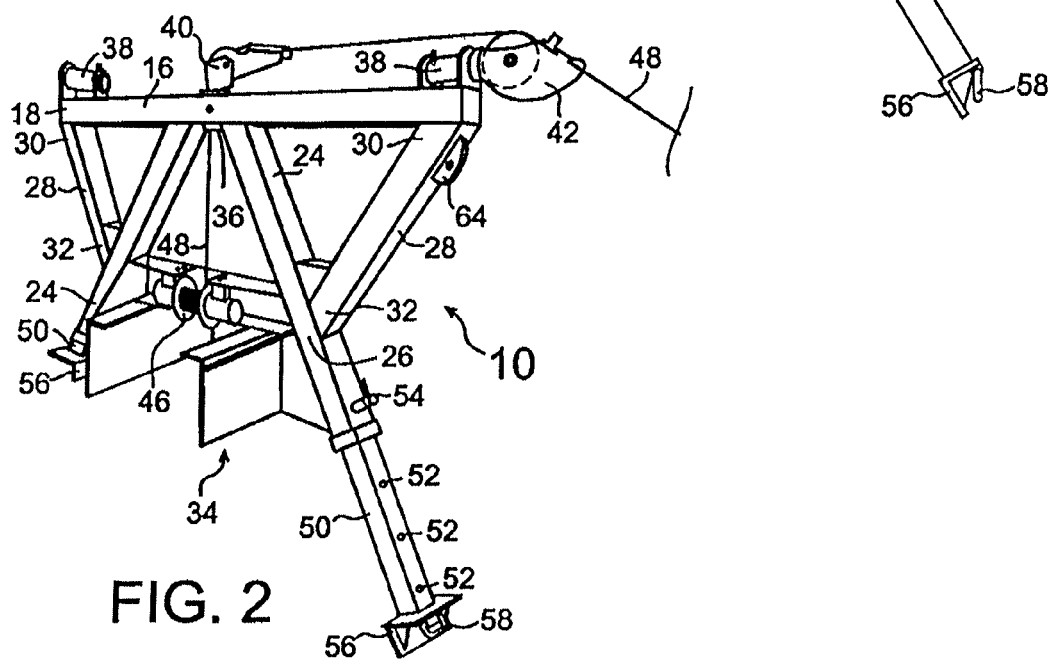
FIG. 2 is a perspective view of the preferred side puller accessory frame.
Figure 3:
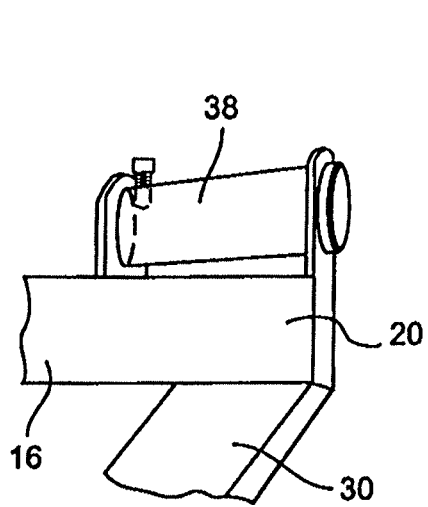
FIG. 3 is a partial perspective view of an upper portion of the side puller accessory frame showing a side sheave mounting tube.
Figure 4:
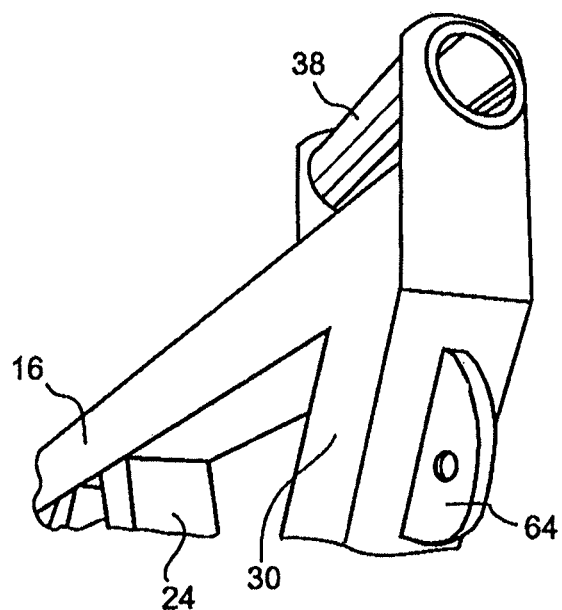
FIG. 4 is a partial perspective view of an upper portion of the side puller accessory frame.
Figure 5:
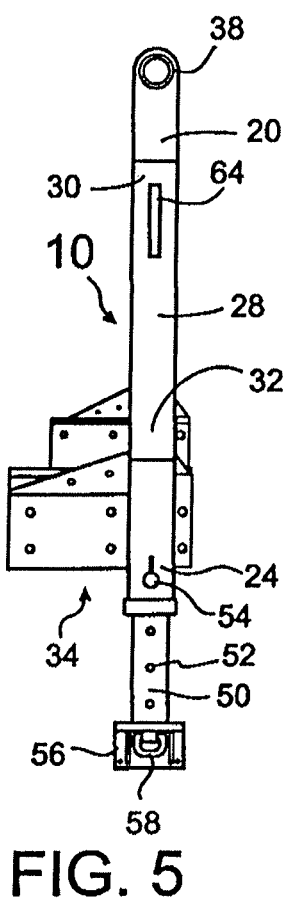
FIG. 5 is a partial side perspective view of a preferred side puller accessory frame having two manually actuated nesting legs.

Referring to FIGS. 1 through 8, a car carrier 6 having a rollback bed 8 often is sent out to respond to motor vehicle accidents. A car carrier 6, a tow truck, or another vehicle equipped with a side puller accessory frame 10 or 10' mounted to a vehicle frame 12 behind a driver's cab 14, the present invention is a novel side puller accessory frame 10 that is fastened preferably with nuts and bolts to the vehicle frame in proximity to the driver's cab and transverse to the longitudinal axis of the vehicle.

Referring to FIG. 1, a side puller accessory frame 10 has a top horizontal frame tube 16, having opposite ends 18 and 20 and a middle point 22; two diagonal frame tubes 24, each diagonal frame tube having a midpoint 26 and each diagonal frame tube joined to the horizontal frame tube with one diagonal frame tube on each side and near the middle point, the diagonal frame tubes diverge downward and away from one another and from the horizontal frame tube. Two angled brace members 28 each having a top end 30 and a bottom end 32 are joined at the top ends respectively to the horizontal frame tube 16 near the opposite ends 18 and 20 and away from the middle point 22; the angled brace members converge downward and towards one another and towards one of the diagonal frame tubes and each of the bottom ends is joined to one of the diagonal frame tubes respectively near one of the midpoints.

An appropriate accessory frame mounting 34 formed to fit and mount closely to a vehicle frame is joined to and bridges between the diagonal frame tubes. Preferably, the accessory frame mounting 34 is mounted to the vehicle frame 12 immediately behind a driver's cab 14 using nuts and bolts and with the side puller accessory frame 10 mounted transverse and across the longitudinal axis of the vehicle. Preferably, the accessory frame mounting 34 is fabricated from steel channel and steel plate using welding techniques well known in the art.

Preferably, the horizontal frame tube 16 has a center sheave mounting tube 36 formed vertically through the middle point 22 and a side sheave mounting tube 38 mounted preferably by welding on each opposite end 18 and 20. A removable pivotable center sheave 40 is mounted in the center sheave mounting tube 36 and a removable pivotable side sheave 42 can be mounted in one or the other side sheave mounting tubes 38. A zerk type grease fitting 44 can be mounted in the center sheave mounting tube 36 to help keep the center sheave 38 easily rotatable.

A powered winch 46 having a line 48 is fixed to the accessory frame mounting 34. Preferably, the winch 46 is fixed to the mounting 34 transverse to the longitudinal axis of the vehicle and between the diagonal frame tubes 24 to allow the line 48 to feed to and from the winch selectively upwards and downwards through the center sheave mounting tube 36 and through a center sheave 40 mounted in the center sheave mounting tube and then either to a load 49 (see FIG. 8) to be pulled or alternatively through a removable pivotable side sheave 42 mounted in one of the side sheave mounting tubes 38.

The winch 46 may be hydraulically powered (the hydraulic system is not shown as such winches and their setup and operation are well known in the art).

Preferably as shown in FIGS. 1 to 5, the side puller accessory frame 10 has two manually actuated nesting legs 50 with one nesting leg nesting and selectively sliding in and out of each of the diagonal frame tubes 24. Each of the nesting legs 50 has a plurality of pin bores 52 predrilled along its length that cooperate with a cam lock 54 fixed to the diagonal frame tube near the end away from the horizontal frame tube 16 to selectively secure the nesting leg within the respective diagonal frame tube 24. The cam lock 54 operates a pin that selectively moves in or out of cooperating engagement with one of a plurality of pin bores 52. Preferably, each nesting leg 50 has a base 56 fixed to its lower end and preferably each leg base has a D-ring 58 attached that may serve as a handle to assist the user in moving the nested leg or to use as an attachment point for a snatch block (not shown) during a recovery.

Figure 6:
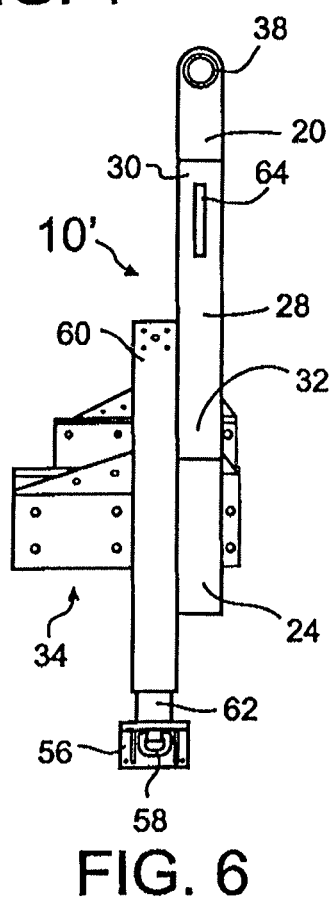
FIG. 6 is a partial side perspective view of an alternative embodiment of a side puller accessory frame having two hydraulically extendable legs.
Figure 7:
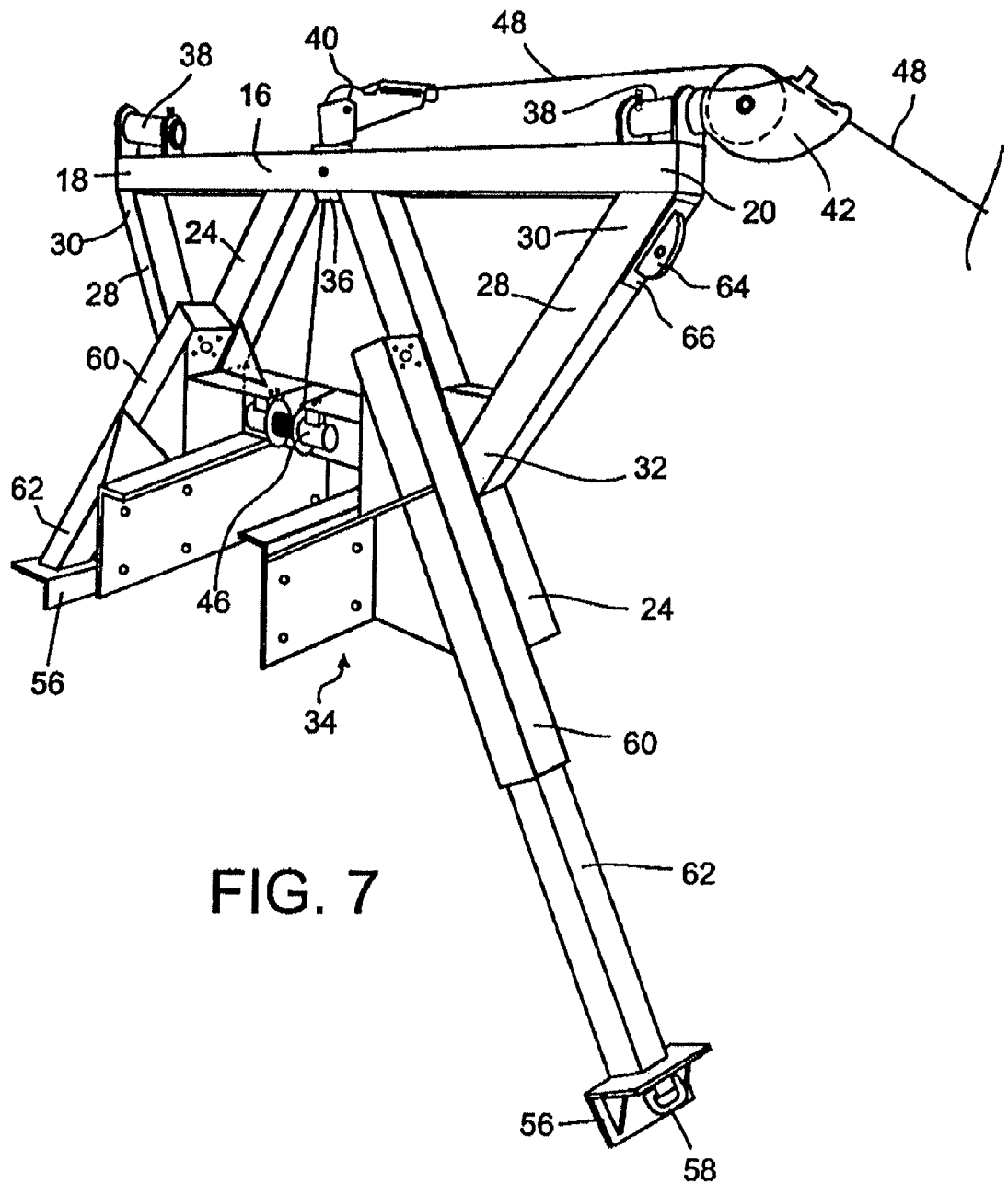
FIG. 7 is a perspective view of an alternative embodiment of a side puller accessory frame.
Figure 8:
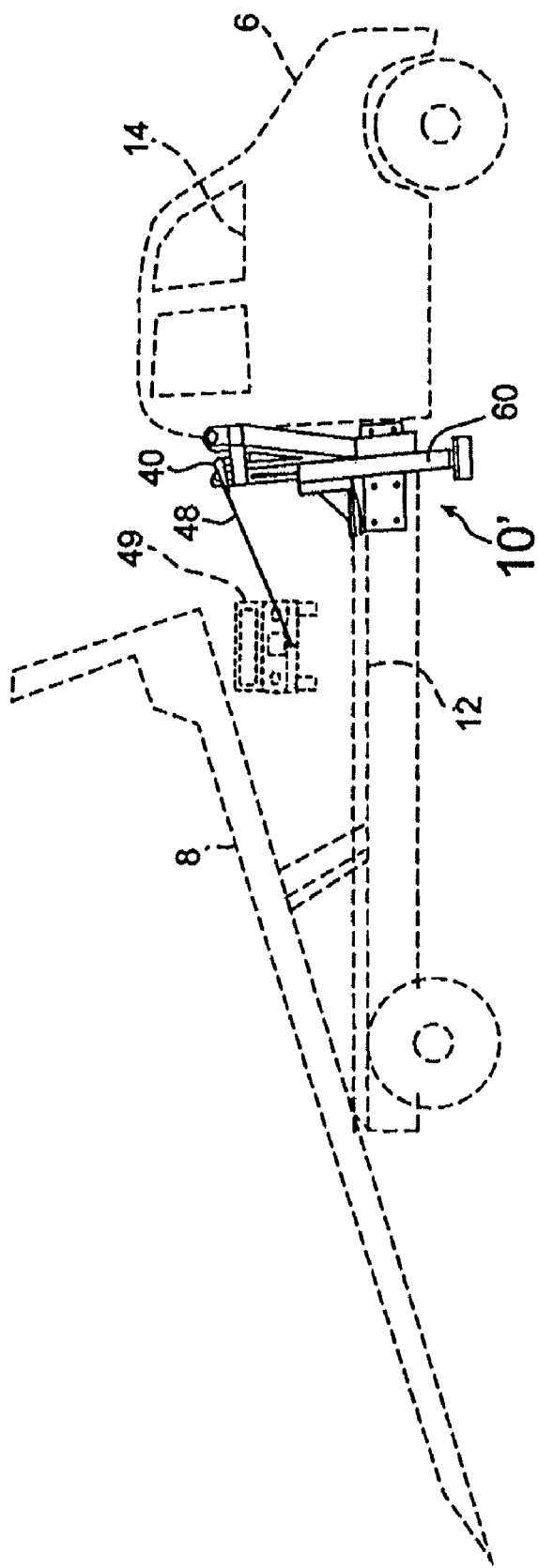
FIG. 8 is a perspective view of a load located off the side of a carrier with a line attached between the load and a winch of a side puller accessory frame directed via a center sheave.

As shown in FIGS. 6, 7, and 8, in an alternative embodiment of a side puller accessory frame 10', two support tube assemblies 60 are joined to the diagonal frame tubes 24 with one of the support tube assemblies joined parallel and along side each respective diagonal frame tube and with each support tube assembly having a hydraulically extendable leg 62 moved by a suitable and operable hydraulic actuator within the assembly that moves the extendable leg selectively downward and outwardly or upward and inwardly. Each hydraulically extendable leg 62 has a base 56 fixed to its lower end and preferably each leg base has a D-ring 58 attached that may serve as an attachment point for a snatch block (not shown) during a recovery. The hydraulic actuator within the support tube assembly 60 and the associated operable hydraulic system and controls are not shown because suitable and operable actuators associated hydraulic equipment, and operable hydraulic systems are readily available and understood in the art.

The side puller accessory frame 10 or 10' may include an anchor tab or tabs 64 attached to the angled brace members 28 to provide attachment points for a snatch block or a shackle. As seen in FIGS. 1 and 7, a reinforcement plate 66 can be used to reinforce the structure of an angled brace member 28 in the immediate vicinity around an anchor tab 64.

Preferably, the components of the side puller accessory frame 10 are fabricated from steel tubing, steel channel and steel plate and elements are joined using welding techniques well known in the art. Other suitable materials and techniques known in the art may also be used.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention.

We claim:

1. A side puller with an accessory frame mounted on a recovery vehicle having a vehicle frame, the side puller accessory frame oriented transversely to a longitudinal axis of the recovery vehicle and the side puller effective for recovering a disabled vehicle located in a remote direction substantially transverse to the longitudinal axis of the recovery vehicle, comprising:
   bracing securely and rigidly fastened to the vehicle frame, the bracing extending above the vehicle frame and having two nesting legs, each nesting leg selectively sliding in and out of a corresponding lower portion of the bracing; and
   a winch whose cable is carried by the accessory frame, wherein the cable may be oriented by components on the bracing in a direction substantially transverse to the longitudinal axis of the vehicle.

2. A side puller with an accessory frame mounted on a recovery vehicle having a vehicle frame, the side puller accessory frame oriented transversely to a longitudinal axis of the recovery vehicle and the side puller effective for recovering a disabled vehicle located in a remote direction substantially transverse to the longitudinal axis of the recovery vehicle, comprising:
   bracing securely and rigidly fastened to the vehicle frame, wherein the bracing extends above the vehicle frame, and comprises a top horizontal frame tube and two diagonal frame tubes, and wherein each diagonal frame tube is joined at an end to said horizontal frame tube;
   a winch whose cable is carried by the accessory frame, wherein the cable may be oriented by components on the bracing in a direction substantially transverse to the longitudinal axis of the vehicle; and
   two support tube assemblies joined to the diagonal frame tubes.

3. The side puller of claim 2, wherein each of the support tube assemblies has an extendable leg.

4. The side puller of claim 3, wherein the extendable leg is movable by a hydraulic actuator.

5. A side puller with an accessory frame mounted on a recovery vehicle having a vehicle frame, the side puller accessory frame oriented transversely to a longitudinal axis of the recovery vehicle and the side puller effective for recovering a disabled vehicle located in a remote direction substantially transverse to the longitudinal axis of the recovery vehicle, comprising:
   bracing, securely and rigidly fastened to the vehicle frame and extending above the vehicle frame; and
   a winch whose cable is carried by the accessory frame, wherein the cable may be oriented by components on the bracing in a direction substantially transverse to the longitudinal axis of the vehicle, wherein the bracing comprises a side sheave mounted on one end of the bracing for supporting and redirecting the cable in a direction transverse to the longitudinal axis of the vehicle and a center sheave mounted centrally on the bracing.

6. The side puller of claim 5, wherein the center sheave comprises a removable pivotable center sheave, and the at least one side sheave comprises a removable pivotable side sheave.

7. The side puller of claim 5, wherein the winch and the sheaves are oriented relative to the bracing to allow the winch cable to feed to and from the winch selectively upwards and downwards through the center sheave, and then through a side sheave to a load to be side-pulled.

\* \* \* \* \*